May 20, 1924.

C. D. PALMER 1,495,036

MEANS FOR CREATING EMERGENCY POWER FOR AIRPLANE RADIO GENERATOR SYSTEMS

Filed Dec. 6, 1921

Inventor
Carlton D. Palmer

By
Attorney

Patented May 20, 1924.

1,495,036

UNITED STATES PATENT OFFICE.

CARLTON DAVID PALMER, OF HAMPTON ROADS, VIRGINIA.

MEANS FOR CREATING EMERGENCY POWER FOR AIRPLANE RADIO GENERATOR SYSTEMS.

Application filed December 6, 1921. Serial No. 520,410.

*To all whom it may concern:*

Be it known that I, CARLTON D. PALMER, a citizen of the United States, residing at the Naval Air Station, Hampton Roads, county of Norfolk, State of Virginia, have invented certain new and useful Improvements in Means for Creating Emergency Power for Airplane Radio Generator Systems, of which the following is a specification.

My invention relates generally to wind tunnels and more particularly to such a device carried by an airplane to aid in securing power for the successful operation of the radio system in the case of an emergency, and has for an object the provision of a device for obtaining an air stream of such velocity as to furnish sufficient power to operate an air driven radio generator from an airplane propeller running at low speed.

Another object of the invention is the provision of a device of the character described to be so placed that the air stream may be concentrated on the air fan of a radio transmitting system generator, thus dispensing with the need of carrying an emergency battery.

A particular object of the invention is the provision of a means for obtaining emergency power for radio transmission from disabled aircraft.

A still further object is to provide a device of the character described of little weight and which may be easily and quickly installed on and removed from an airplane.

With these and other objects in view the invention consists in the construction, combination and arrangement of parts as will be hereinafter described.

Reference is to be had to the accompanying drawings forming part of this specification, in which like reference characters indicate corresponding parts throughout the several views, and in which—

Figure 1:
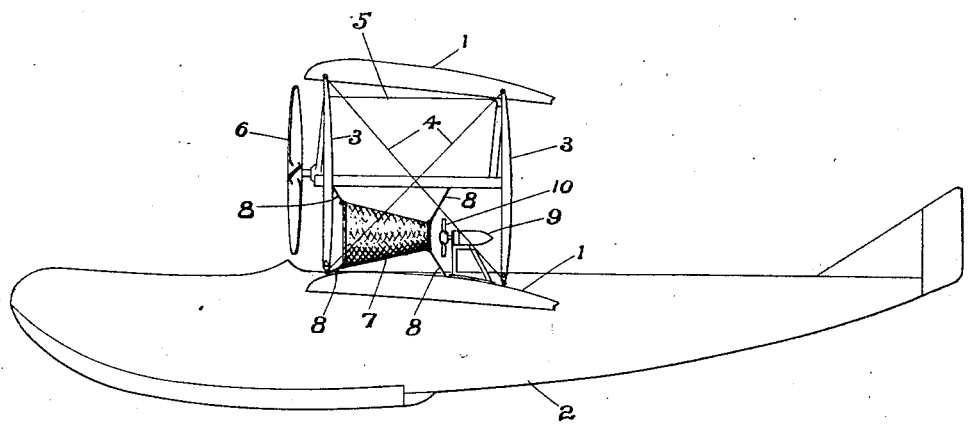
Figure 1 is a view showing my invention attached to an aircraft.
Figure 2:
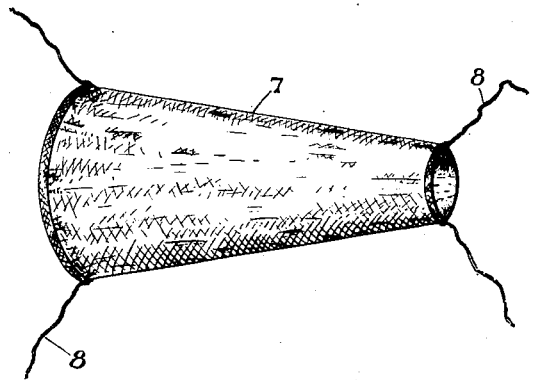
Fig. 2 is a perspective view of my invention.

Referring more particularly to the drawings, Figure 1 shows a side view of a biplane flying boat having planes 1, struts 3, stay wires 4, engine 5, propeller 6, radio transmitting generator 9 with air driven fan 10, all mounted on boat 2. The propeller is shown as being forward of the engine, of traction type. Between the propeller blades and generator is set up a wind tunnel 7, Fig. 2, having a large opening facing the propeller and a small opening facing the air-driven fan 10. The tunnel may be made of canvas, or other suitable durable material, and is held in place by lanyards 8 secured to available parts of the structure, the air fan being close to the small opening. By this structure the tunnel need not be set up until there is reason for its use.

It often happens that an airplane is forced to land, and in such instances it may be desirable to use the radio set to send distress calls. To provide for this emergency, storage batteries have in some instances been furnished in order that an auxiliary source of power may be had for driving the radio set, but such batteries are very heavy and otherwise undesirable. It is also usually undesirable to run the engine at a high speed to form a high velocity propeller air stream with which to drive the air fan, as such fan usually operates to produce full speed of the generator under full load at 40 miles per hour and above. This is especially so in the case of a seaplane, as it will be forced ahead by the high speed of the propeller, and if the sea is rough great damage may be done endangering the plane. I have found that by placing a tunnel of more or less frusto-conical shape in the air stream between the propeller and air fan, it is not necessary to drive the engine at high rates in order to secure sufficient air stream velocity to get full power out of the air fan generator. This result is obtained both from the shape of the tunnel and the fact that the proper part of the air stream has a velocity considerably in excess of the speed of the plane even when in the air. For instance, in the case of a certain $\frac{1}{4}$ K. W. air fan driven generator without the tunnel it was necessary to drive the engine at 1000 revolutions per minute to get full generator power, while, with the tunnel the revolutions could be cut down to 550 per minute, or nearly idling speed. At the first speed great damage would have resulted to a seaplane in rough water, while at the second speed, it would have been quite comfort-able.

There are many ways for obtaining an antenna on airplanes for radio transmitting when on the ground, such as hoisting a wire by a small kite or balloon, or using a telescopic mast, and if power is available, messages may be sent to long distances, thus increasing safety of aerial navigation.

I have made a canvas tunnel suitable for a ½ K. W. generator which weighs only seven pounds, and by using silk the weight would be much less. The device could be easily rigged or unrigged and stowed in a small space. Storage batteries for auxiliary power usually weigh forty or fifty pounds.

Various changes in the form, proportion and the minor details of construction may be resorted to without departing from the principle or sacrificing any of the advantages of this invention as claimed.

Having fully described my invention what I claim as new is:

1. A source of emergency power on airplanes comprising an airplane driving propeller, means for driving said propeller and regulating its speed to less than normal flying speeds, means for collecting a large portion of the energy of said relatively slow moving propeller and condensing said energy into a small stream of high velocity air currents comprising a tunnel having a relatively large entering end positioned in the air stream of said prepeller and unobstructedly tapering to a relatively small exit end, and means for converting a large part of the energy of said small stream of high velocity air currents to rotary motion comprising an air fan so positioned in said last stream as to practically cover its cross-sectional extent and having all of its driving surfaces simultaneously acted upon by said stream.

2. A source of emergency power on airplanes comprising an airplane driving propeller, means for driving said propeller, means for collecting a large portion of the energy of said driven propeller comprising a temporarily rigged frustro-conical wind tunnel in the air stream of said propeller, the frustro-cone base of said tunnel being relatively large and comprising its entering end, and its top being relatively small and comprising its exit and an air fan having all of its driving surfaces adapted to be simultaneously acted upon by the air passing through said exit.

3. A wind tunnel for airplanes having its entering end considerably larger than its delivery end and fabricated of material suitable for collapsing and stowing in a small space, and means for rigging and unrigging the tunnel for use as required.

CARLTON DAVID PALMER.